Dec. 29, 1970  J. A. GREACEN  3,550,391
ABSORPTION REFRIGERATION SYSTEM HAVING COMPENSATED
DILUTION CONTROL
Filed June 23, 1969
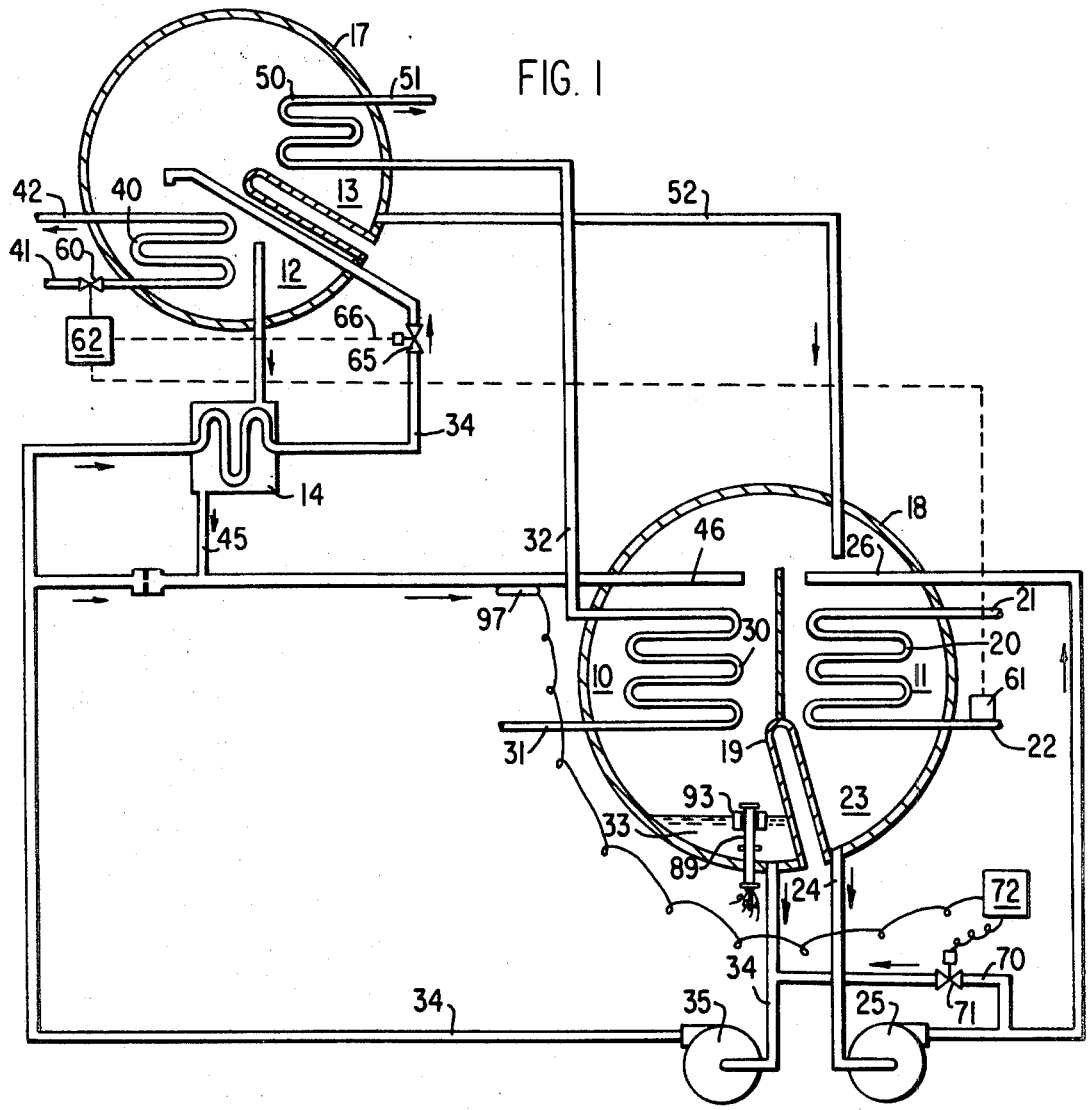
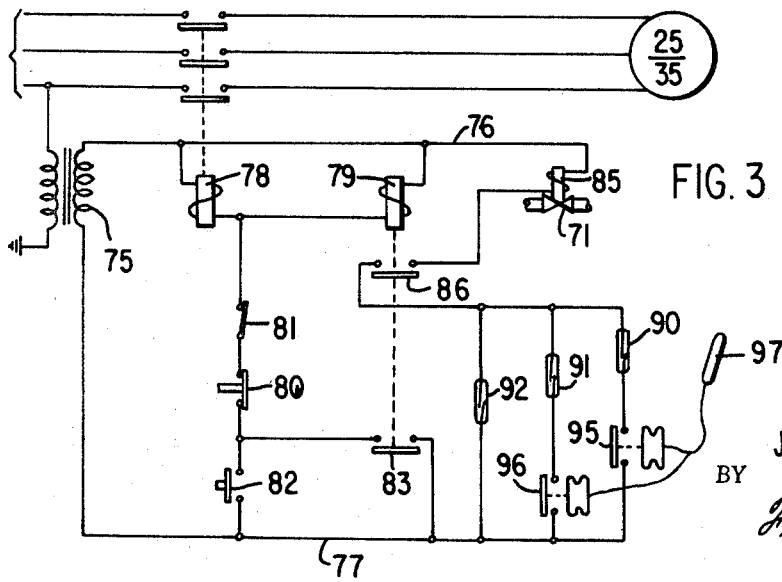
INVENTOR.
JOHN A. GREACEN.
BY
Frank N. Decker Jr.
ATTORNEY.

INVENTOR.
JOHN A. GREACEN.
BY
Frank N. Decker Jr.
ATTORNEY.

United States Patent Office
3,550,391
Patented Dec. 29, 1970

3,550,391
ABSORPTION REFRIGERATION SYSTEM HAVING COMPENSATED DILUTION CONTROL
John A. Greacen, Fayetteville, N.Y., assignor to Carrier Corporation, Syracuse, N.Y., a corporation of Delaware
Filed June 23, 1969, Ser. No. 835,473
Int. Cl. F25b 15/06
U.S. Cl. 62—103
12 Claims

ABSTRACT OF THE DISCLOSURE

An absorption refrigeration system having a dilution passage with a dilution valve therein extending between the discharge of the refrigerant pump and the inlet of the absorber pump. Three level responsive switches are disposed at staggered levels in the absorber sump. A pair of temperature responsive thermostatic switches are disposed to sense the temperature of strong solution leaving the solution heat exchanger. A control circuit is provided to open the dilution valve and dilute the absorbent solution in response to a predetermined combination of temperature and absorbent solution level to avoid solidification of the absorbent solution.

BACKGROUND OF THE INVENTION

This invention relates to absorption refrigeration systems having means for limiting the concentration of absorbent solution at various locations in the system where undesirable solidification is likely to occur. If the absorbent solidifies in the strong solution passage or in the solution heat exchanger, the normal supply of absorbent to the absorber will be stopped and the system will begin to lose capacity, which will further aggravate the problem because the rise in chilled water temperature will cause the generator to work harder, concentrating the absorbent more highly, which in turn increases the likelihood of additional solidification. Solidification of absorbent on the absorber heat exchanger may result in accumulation of an insulating layer of salt on the heat exchanger which reduces heat transfer between the absorbent and the cooling medium and decreases the absorption of the refrigerant vapor. Consequently, the effect of the build-up of salt on the absorber heat exchanger causes the machine to lose capacity which in turn tends to force the generator to concentrate the salt more with the eventual result of increasing the solidification. A seriously solidified machine may require a number of hours to desolidify before it is again capable of functioning to provide cooling.

Absorption refrigerant systems are usually designed to prevent solidification under normally encountered operating conditions. Prior systems have been provided with a dilution control for mixing refrigerant with absorbent solution at any time that the concentration of absorbent solution exceeds a maximum in the absorber. It is essential that prior dilution controls be set to operate only when the absorbent concentration exceeds a concentration which is greater than encountered under full load operating conditions. Consequently, the selected maximum concentration had to be set fairly high or the capacity of the machine suffered. Nevertheless, solidification can occasionally occur when the concentration of absorbent solution is below the desired full load concentration at which the control is set. For example, solidification at lower concentration can occur due to an abnormally low absorber temperature at a time when the refrigeration demand is heavy. Similarly, an air leak into the machine or failure of the purge may give rise to solidification at lower than normal maximum operating concentrations. The problem is further compounded by the fact that the solidification curve for lithium bromide solution is not linear so that it is difficult to select an acceptable maximum solution concentration for the range of temperatures encountered in a practical system without unnecessarily restricting the capacity of the machine.

In addition to the above problems, over-concentration of absorbent solution causes the quantity of liquid in the absorber sump to decrease. It can occur that the head of liquid on the absorber pump becomes lower than that needed to prevent cavitation and injury to the pump due to over-concentration of solution even before the solidification concentration is reached.

Accordingly, it is a principal feature of this invention to provide a control system which inhibits solidfication or over-concentration of the absorbent solution under a variety of different conditions without unnecessarily limiting the maximum operating concentration and refrigeration capacity of the system.

SUMMARY OF THE INVENTION

An absorption refrigeration system in accordance with this invention includes a dilution passage and a dilution valve for mixing refrigerant with absorbent solution. An absorbent concentration sensing means is included which is responsive to a condition of operation of the system that is a function of the absorbent concentration, such as the level of absorbent solution in the absorber sump. An absorbent solution temperature sensing means is also included which is responsive to a condition of operation of the system that is functionally related to a temperature of the absorbent solution, such as the temperature of solution leaving the solution heat exchanger. A control circuit for the dilution valve is provided which causes the dilution valve to open according to a predetermined program of maximum permissible solution concentration for a given sensed solution temperature.

For example, the dilution valve may be programed to open at a relatively high solution concentration when the temperature of the absorbent solution is high but at the same time to open at a relatively low concentration when the temperature of the absorbent solution is low, because the likelihood of crystallization at a low concentration is greater at low temperature. In the preferred embodiment, three steps of concentration and two temperature control steps may be combined to provide three different maximum concentrations under varying operating temperature and concentration conditions.

BRIEF DESCRIPTION OF THE DRAWINGS

FIG. 1 illustrates a schematic flow diagram partly in cross-section of an absorption refrigeration system embodying a dilution control arrangement in accordance with this invention;

FIG. 3 schematically illustrates an electrical control system providing the dilution control in accordance with this invention.

DESCRIPTION OF THE PREFERRED EMBODIMENT

Figure 2:
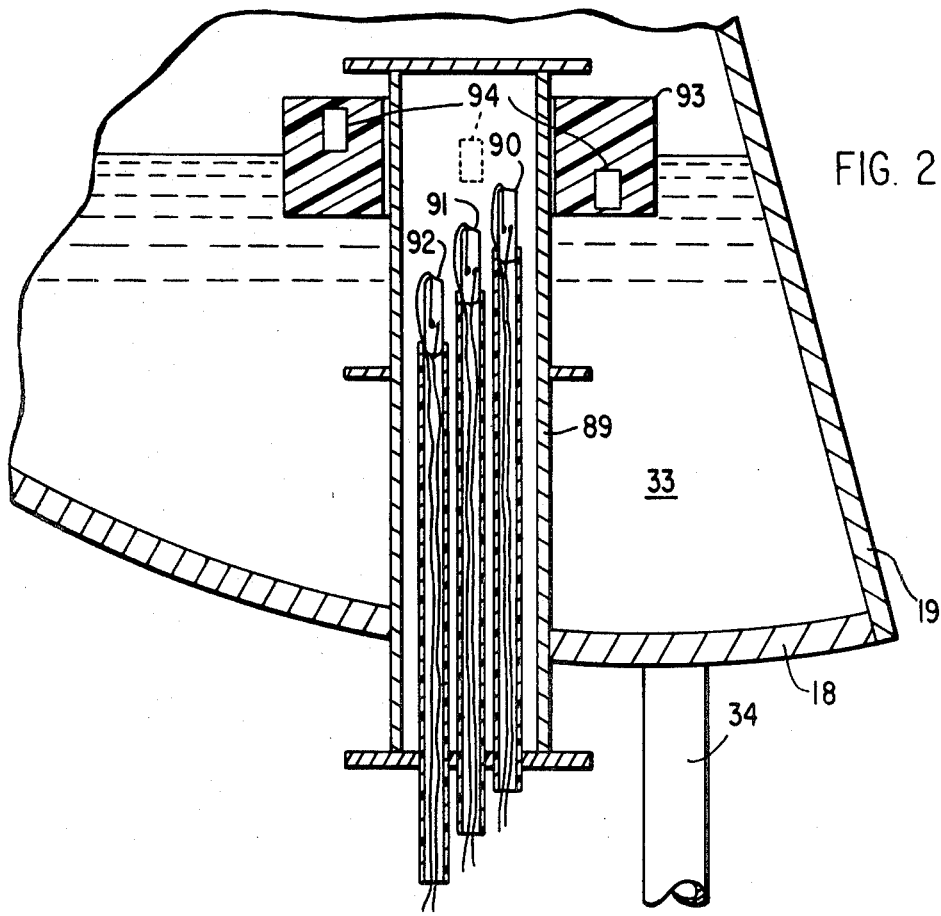
FIG. 2 is a detailed cross-sectional view illustrating an absorbent concentration sensing arrangement in accordance with this invention.

Referring to FIG. 1, there is shown an absorption refrigeration system comprising an absorber 10, a refrigerant evaporator 11, a generator 12, a refrigerant condenser 13, and a solution heat exchanger 14 arranged in a refrigerant circuit. Absorber 10 and refrigerant evaporated 11 are preferably disposed side by side in a common shell 18 and are separated by a partition 19. Similarly, generator 12 and condenser 13 may be disposed in a common shell 17.

A suitable refrigerant for the system is water and a suitable absorbent solution is an aqueous solution of lithium bromide. As used herein, the term "strong" solution describes a concentrated solution of absorbent which is strong in absorbing power, and the term "weak" solution is used to describe a dilute solution of absorbent which is weak in absorbing power.

Evaporator 11 comprises an evaporator heat exchanger 20 for the circulation therethrough of a fluid medium, such as water, being cooled by heat exchange relation with evaporating refrigerant. The fluid is chilled by passage through heat exchanger 20 and is circulated through outlet passage 22 to a suitable remote heat exchanger (not shown) where it absorbs heat from a refrigeration load. The fluid medium is then returned to the evaporator through inlet line 21 for re-cooling. The lower portion of the evaporator between shell 18 and partition 19 forms a refrigerant sump 23 for the accumulation of unevaporated refrigerant. Refrigerant recirculation passage 24 and an electric motor driven refrigerant pump 25 pass refrigerant to spray headers 26, which discharge liquid refrigerant over evaporator heat exchanger 20 to absorb heat from the fluid being cooled.

Absorber 10 comprises an absorber heat exchanger 30 having an inlet passage 31 and an outlet passage 32 for passing a cooling medium in heat exchange relation with absorbent solution to cool the absorbent solution and to promote absorption of refrigerant vapor into the solution. The lower portion of absorber 10 comprises an absorber sump 33 for the accumulation of absorbent solution. Solution from absorber sump 33 passes through weak solution passage 34 and is pumped by an electric motor driven weak solution pump 35 through the interior passage of solution heat exchanger 14 to generator 12 for concentration therein.

Generator 12 comprises a generator heat exchanger 40 having an inlet passage 41 and an outlet passage 42 for passing a heating medium in heat exchange relation with absorbent solution in the generator. In the embodiment illustrated, the heating medium is preferably steam, although other media, such as hot water or combustion gas from a gas burner, may be employed. The absorbent solution in the generator is concentrated by boiling the vaporized refrigerant from the weak solution, thereby forming a strong absorbent solution and refrigerant vapor.

The hot strong solution from generator 12 passes via strong solution passage 45 through the exterior passage of solution heat exchanger 14 and is discharged through absorber spray header 46 over absorber heat exchanger 30. The strong solution preheats the weak solution in heat exchanger 14 to reduce the heat input required in the generator, thereby cooling the strong solution. The cooled strong solution is then further cooled in absorber 10 by heat exchanger 30 to promote the absorption of refrigerant vapor into the strong solution.

Condenser 13 comprises a condenser heat exchanger 50 having an inlet connected to outlet passage 32 from absorber heat exchanger 30, and having an outlet 51 for the passage of cooling medium through the condenser heat exchanger. Refrigerant vapor separated from absorbent solution in generator 12 passes into condenser 13 in heat exchange relation with the cooling medium, thereby condensing the refrigerant vapor. The condensed refrigerant passes through refrigerant liquid passage 52 and is discharged over heat exchanger 20.

A heating medium control valve 60 is disposed in inlet passage 41 to generator heat exchanger 40 and arranged to control the passage of heating medium to the generator. A temperature sensor 61 is secured at a suitable location, such as chilled water passage 22, to provide a control signal which is a function of the refrigeration demand imposed on the system. A solution control valve 65 is preferably disposed in weak solution line 34 between the outlet of heat exchanger 14 and generator 12. Solution valve 65 is connected by a control line 66 to a suitable control signal source, such as a pneumatic control relay 62, to position the solution valve in accordance with the refrigeration demand imposed on the system. Valve 65 is arranged to reduce the solution flow to the generator when the signal to heating medium valve 60 is reduced below a predetermined level indicative of a light refrigeration load on the system.

A dilution passage 70 having a dilution valve 71 therein extends between the discharge of refrigerant pump 25 and the inlet of weak solution pump 35. When dilution passage 70 is opened, liquid refrigerant from refrigerant sump 23 passes through the dilution line into weak solution line 34 to lower the average concentration of absorbent solution in the system. A dilution control circuit 72 is provided to control the operation of the dilution valve 71.

Referring particularly to FIG. 2, there is shown a mechanical arrangement for detecting the concentration of absorbent solution in the system. A hollow tube 89 is welded to the bottom of the shell 17 and projects upwardly through absorber sump 33. The upper end of the tube 89 is sealed and the lower end is preferably open to the atmosphere. A plurality of reed switches 90, 91, 92 are vertically disposed at different elevations within tube 89. Means may be provided for adjusting the level of the reed switches relative to each other and to the level of absorbent solution in sump 33. A suitable float 93 carrying a plurality of staggered bar magnets 94 is arranged about the exterior of tube 89 to actuate the reed switches of correponding and greater elevation in accordance with the level of solution in the absorber sump.

The level of absorbent solution in absorber 33 is functionally related to the concentration of absorbent solution in the absorber. When the absorbent solution in sump 33 is highly diluted, it contains a substantial quantity of water, and the level of solution in sump 33 will be high. Consequently, when the absorbent solution in sump 33 is highly concentrated, it will contain less water and the level in the sump will be low. Preferably about three switches, or three sets of switches are used in the absorber to detect levels corresponding to about sixty-three, sixty-four and sixty-five percent absorbent concentration respectively.

A temperature sensing bulb 97 is preferably connected to strong solution passage 45 to sense the temperature of strong solution entering absorber 10. Bulb 97 is connected to a low temperature thermostat 95 and a high temperature thermostat 96. The switch contacts of thermostat 95 close if the sensed temperature of absorbent solution is below some predetermined value, such as about 110° F. Thermostat 96 closes if the sensed temperature of absorbent solution is below a higher predetermined temperature such as about 120° F.

A simplified electrical control schematic is shown in FIG. 3 illustrating a suitable dilution control 72 in accordance with this invention. The secondary winding 75 of a power transformer is connected to supply current to conductors 76, 77 respectively. A motor control relay 78 for controlling the operation of solution pump 35 and refrigerant pump 25 is connected in parallel with a control relay solenoid 79. The parallel combination is connected across conductors 76 and 77 in series with stop switch 80, safety switch 81, and the parallel combination of start switch 82 and switch 83 of control relay 79. Solenoid 85 of normally closed dilution value 71 is connected between conductor 76 and switch 86 of control relay 79. Switch 86 is in turn connected to conductor 77 in series with the parallel combination of reed switch 92, switch 91 in series with thermostat 96, and reed switch 90 in series with thermostat 95. Various additional safety and control features may be added to the basic control circuit if desired.

When it is desired to operate the absorption refrigeration system, start switch 82 is momentarily depressed, which energizes motor relay solenoid 78 and control relay solenoid 79. Energizing control relay solenoid 79 closes switch 86 and holding switch 83 which maintains solenoid 79 energized after start switch 82 is opened. Energizing motor relay solenoid 78 causes the various pumps and other electrical apparatus of the system to function until either stop switch 80 is manually opened or one of a number of safety switches, schematically illustrated, as switch 81, opens to terminate operation of the system.

If the absorption refrigeration system is operating with a concentration of absorbent solution in sump 33 at about sixty-four percent, the level of solution in absorber sump 33 will be at about the level of reed switch 91. Magnets 94 in float 93 will cause switches 90 and 91 to close. Dilution valve 71, which is normally closed, remains closed, unless the temperature of the absorbent solution sensed by thermostatic bulb 97 is less than about 120° F., in which event, switch 96 will close. Closure of float switch 91 simultaneously with thermostat switch 96 will complete a circuit through solenoid 85 of dilution valve 71 and cause refrigerant to be bled through passage 70 into passage 34. The bleeding of refrigerant into the weak solution passage causes the absorbent solution concentration in the generator to decrease, which in turn results in a decrease in concentration of solution passing to the absorber through strong solution passage 45. When the concentration of solution in absorber sump 33 drops below about sixty-four percent, the solution level will rise and switch 91 will open to terminate the dilution of the absorbent.

Assuming the system continues to operate in a dilute condition so that float 93 is adjacent reed switch 90 but above reed switch 91, the temperature of the absorbent solution will have to drop below about 110° F. before dilution is initiated. On the other hand, if the concentration of absorbent solution in sump 33 rises to about sixty-five percent, the dilution will be initiated irrespective of the temperature of the absorbent solution. This is desirable because an excessive drop in solution level in sump 33 may present a solidification problem, and also may result in insufficient solution head on solution pump 35 to prevent cavitation thereof. Diluting the solution at the level of reed switch 92 will insure a minimum solution head on pump 35 at all times and will protect absorbent solution pump 35 from operating with insufficient liquid.

Figure 4:
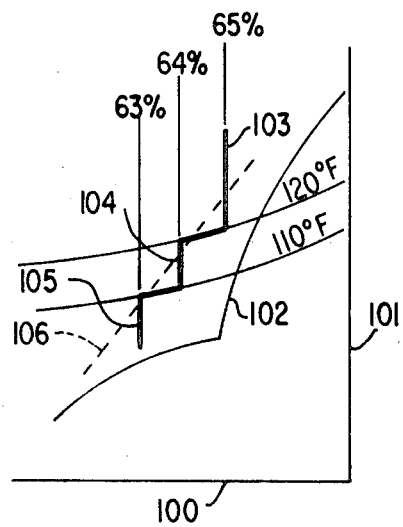
FIG. 4 illustrates a lithium bromide solution property chart showing a preferred control characteristic for a dilution control in accordance with this invention.

The operation described is graphically illustrated in FIG. 4 which illustrates absorbent solution concentration plotted on axis 100 against absorbent solution temperature on axis 101. The crystallization characteristic line of lithium bromide solution is approximately illustrated by line 102. Any combination of temperature and concentration on the right hand side of the line 102 represents a solidification condition to be avoided. Line 103 illustrates the maximum obtainable concentration of absorbent solution under any condition of operation of the system when reed switch 92 is placed in a position to detect a concentration of about sixty-five percent. As explained, the dilution valve will be opened at this concentration irrespective of any temperature condition in the system. If, on the other hand, the solution concentration drops below about sixty-five percent, the dilution valve will only open if thermostatic switch 96 detects a temperature below about 120° F., which limits the concentration to about sixty-four percent as shown by line 104. If the solution concentration in the machine drops below about sixty-four percent, dilution valve 71 will be opened only if the system detects a temperature below about 110° F. which limits the concentration to about sixty-three percent as illustrated by line 105.

While it is preferred to utilize level responsive switches to detect solution level in the absorber as a means for sensing absorbent concentration, it is also possible to utilize level responsive switches in the evaporator sump placed in the inverse order of height for the same purpose. It will be appreciated that the level in the evaporator will vary directly with the concentration of absorbent solution, being highest in the evaporator when the absorbent solution concentration is highest. Similarly, the density or specific gravity of absorbent solution passing to or from the absorber may be utilized as a measure of concentration, if desired. While it is preferred to place temperature sensing bulb 7 at the location shown in the drawings adjacent header 46, the bulb may be located anywhere on line 45 with varying degrees of sensitivity to achieve a similar result. In addition, the bulb may be located adjacent the discharge of spray header 46 or a suitable pressure sensor may be disposed in the vapor space in absorber 10 to measure absorber pressure to obtain a function of solution temperature for the purposes of the invention.

It is also possible to utilize a single variable temperature sensor and/or a single variable concentration sensor in a suitable electronic bridge circuit to achieve a continuously variable function of concentration and/or temperature, and obtain a continuous controrl function as shown by line 106 in FIG. 4. For example, temperature may be measured by a thermistor on passage 45 and the concentration may be measured by a continuously variable density sensor or a float-operated variable resistance element. In effect, this arrangement gives an infinite number of temperature and concentration steps for controlling the operation of the dilution valve.

It will be also appreciated that other dilution valve means may be employed, such as a plurality of valve overflow passages of differing levels from the evaporator to the absorber, wherein a selected one of the valves is actuated by the dilution control described.

While the preferred embodiment of this invention has been described for purpose of illustration, it will be appreciated that the invention may be otherwise embodied within the scope of the following claims.

I claim:
1. An absorption refrigeration system comprising:
 (A) an evaporator for evaporating refrigerant in heat exchange relation with a fluid medium being cooled;
 (B) an absorber for passing absorbent solution in heat exchange relation with a cooling medium to promote absorption of refrigerant vapor into the cooled absorbent solution;
 (C) a generator for passing heating medium in heat exchange relation with absorbent solution to concentrate the solution by vaporizing refrigerant therefrom;
 (D) a condenser for passing a cooling medium in heat exchange relation with refrigerant vaporized in the generator to condense the refrigerant;
 (E) a refrigerant dilution passage including dilution valve means for mixing liquid refrigerant with absorbent solution in the system to dilute the absorbent solution upon opening of said dilution valve;
wherein the improvement comprises:
 (F) absorbent concentration responsive sensing means for sensing a condition of operation of said system which is a function of a concentration of absorbent solution in said system;
 (G) absorbent temperature responsive sensing means for sensing a condition of operation of said system which is a function of a temperature of absorbent solution in said system; and
 (H) control circuit means for controlling the opening and closing of said dilution valve means during operation of said system in response to a combined function of absorbent solution temperature and absorbent solution concentration, said control circuit causing said dilution valve means to open and mix refrigerant with absorbent solution whenever the sensed absorbent solution concentration reaches a predetermined maximum desired concentration for the particular sensed absorbent solution temperature condition according to a predetermined program of combinations of maximum desired solution concentration for a particular temperature condition, whereby the absorbent solution is diluted to inhibit solidification thereof whenever one of said plurality of predetermined combinations of temperature and concentration is reached during operation of the system.

2. An absorption refrigeration system as defined in claim 1 wherein said absorbent temperature responsive sensing means comprises means for sensing the temperature of absorbent solution passing to said absorber from said generator.

3. An absorption refrigeration system as refined in claim 1 wherein said absorbent concentration responsive sensing means camprises level responsive means disposed for sensing the level of one of the liquids in said system.

4. An absorption refrigeration system as defined in claim 1 wherein said absorbent concentration responsive sensing means comprises level responsive means disposed for sensing the level of absorbent solution in said absorber.

5. An absorption refrigeration system as defined in claim 1, said system including an absorbent solution pump for passing weak absorbent solution from the absorber to the generator, said absorbent concentration sensing means comprising a plurality of float actuated switches disposed to sense different levels of one of the liquids in said system, at least one of said switches being disposed for sensing a liquid level functionally related to a relatively high absorbent solution concentration and beng connected in said control circuit for opening said dilution valve means irrespective of the sensed temperature of absorbent solution, thereby protecting the absorbent solution pump from running with insufficient liquid as well as defining a maximum solution concentration during operation of said system.

6. An absorption refrigeration system as defined in claim 1, said system including a solution heat exchanger for passing strong solution from the generator to the absorber in heat exchange relation with weak solution passing from the absorber to the generator; said absorbent temperature responsive sensing means comprising thermostatic means responsive to the temperature of strong solution passing from solution heat exchanger to said absorber, and said absorbent concentration responsive sensing means comprising level responsive means disposed to sense the level of one of the liquids in said system.

7. An absorption refrigeration system as defined in claim 1, said system including a solution heat exchanger for passing strong solution from the generator to the absorber in heat exchange relation with weak solution passing from the absorber to the generator; said absorbent temperature responsive sensing means comprising a plurality of thermostatically responsive switches disposed to sense different temperature levels of strong solution passing between said solution heat exchanger and said absorber; said absorbent concentration responsive sensing means comprising a plurality of level responsive switches disposed to sense different levels of absorbent solution in said absorber.

8. A method of producing refrigeration from an absorption refrigeration system having an evaporator for cooling a fluid medium by evaporating refrigerant, an absorber for absorbing refrigerant evaporated in the evaporator into an absorbent solution, a generator for concentrating absorbent solution by heating absorbent solution and vaporizing refrigerant therefrom, a condenser for condensing refrigerant vaporized in the generator, and dilution valve means for mixing refrigerant liquid and absorbent solution to inhibit solidification of absorbent solution, which comprises the steps of:

(A) passing strong absorbent solution from the generator to the absorber for absorbing refrigerant vapor therein;
(B) passing absorbent solution from the absorber to the generator for heating therein, thereby vaporizing refrigerant and concentrating the absorbent solution;
(C) passing refrigerant vapor from the generator to the condenser for condensing therein;
(D) passing condensed refrigerant from the condenser to the evaporator for evaporating the refrigerant therein in heat exchange relation with a medium to be cooled;

wherein the improvement comprises dilution of the absorbent solution by:

(E) sensing a condition of operation of said system which is a function of a concentration of absorbent solution therein;
(F) sensing a condition of operation of said system which is a function of a temperature of absorbent solution therein; and
(G) regulating opening and closing of the dilution valve means in response to the existence of one of a predetermined plurality of predetermined combinations of sensed absorbent solution concentration and absorbent solution temperature during operation of the system, and thereby mixing liquid refrigerant and absorbent solution and inhibiting solidification of the absorbent solution when the sensed absorbent solution concentration reaches a predetermined maximum desired concentration for the particular sensed absorbent solution temperature condition.

9. A method of producing refrigeration as defined in claim 8 wherein the step of sensing a condition of operation of said system functionally related to a concentration of absorbent solution therein comprises sensing a level of one of the liquids in said system.

10. A method of producing refrigeration as defined in claim 8 wherein the step of sensing a condition of operation of said system functionally related to a concentration of adsorbent solution therein comprises sensing a level of absorbent solution in the absorber.

11. A method of producing refrigeration as defined in claim 8 wherein the step of sensing a condition of operation of said system functionally related to a temperature of absorbent solution comprises sensing the temperature of strong absorbent solution passing to said absorber from said generator.

12. A method of producing refrigeration as defined in claim 8 including the step of passing strong solution from the generator to the absorber in heat exchange relation with weak solution passing from the absorber to the generator; wherein the step of sensing a condition of operation of the system functionally related to a temperature of absorbent solution therein comprises the step of sensing a temperature of strong solution passing from the solution heat exchanger to the absorber; and wherein the step of sensing a condition of operation of the system functionally related to a concentration of absorbent solution comprises the step of sensing a level of one of the liquids in said system.

References Cited
UNITED STATES PATENTS

| | | | |
|---|---|---|---|
| 3,262,282 | 7/1966 | Aronson | 62—476X |
| 3,426,548 | 2/1969 | Greacen et al. | 62—101 |
| 3,452,552 | 7/1969 | Johnson | 62—141 |

MEYER PERLIN, Primary Examiner

P. D. FERGUSON, Assistant Examiner

U.S. Cl. X.R.

62—107, 108, 141, 147